(12) United States Patent
Karuppiah et al.

(10) Patent No.: US 11,729,045 B2
(45) Date of Patent: Aug. 15, 2023

(54) AGGREGATED NETWORKING DEVICE FAILOVER SYSTEM

(71) Applicant: Dell Products L.P., Round Rock, TX (US)

(72) Inventors: Kannan Karuppiah, Fremont, CA (US); Udhaya Chandran Shanmugam, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 164 days.

(21) Appl. No.: 17/217,664

(22) Filed: Mar. 30, 2021

(65) Prior Publication Data
US 2022/0321398 A1 Oct. 6, 2022

(51) Int. Cl.
*G06F 15/16* (2006.01)
*H04L 41/0654* (2022.01)
*H04L 61/50* (2022.01)
*H04L 101/622* (2022.01)

(52) U.S. Cl.
CPC .......... *H04L 41/0654* (2013.01); *H04L 61/50* (2022.05); *H04L 2101/622* (2022.05)

(58) Field of Classification Search
CPC ................ H04L 41/0654; H04L 61/50; H04L 2101/622; Y02D 30/50

USPC .......................................................... 370/217
See application file for complete search history.

(56) References Cited

U.S. PATENT DOCUMENTS 9,647,933 B1 * 5/2017 Tawri .................. G06F 11/2005

* cited by examiner

*Primary Examiner* — Lan Dai T Truong
(74) *Attorney, Agent, or Firm* — Joseph Mencher

(57) ABSTRACT

An aggregated networking device failover system includes an aggregation connected device coupled to first and second aggregated networking devices. The aggregation connected device receives a first aggregation communication from the first aggregated networking device that identifies its first MAC address as an actor MAC address, and a second MAC address of the second aggregated networking device as an alternate actor MAC address. The aggregation connected device then associates the first and second MAC addresses with an aggregated link to the first and second aggregated networking devices. Subsequent to associating the first and second MAC addresses with the aggregated link, the aggregation connected device receives a second aggregation communication from the second aggregated networking device that identifies its second MAC address as an actor MAC address, and the aggregated link remains available in response to that second/actor MAC address being associated with the aggregated link.

20 Claims, 12 Drawing Sheets

| PREAMBLE 602 | DEST. MAC ADDRESS 604 | SOURCE MAC ADDRESS 606 | ETHER TYPE 608 | SUB TYPE 610 | LACP VERSION 612 | DATA (TLV) 614 | FCS 616 |

TLV ACTOR INFORMATION 614a

| TYPE | LENGTH | ACTOR SYSTEM PRIORITY | ACTOR MAC ADDRESS | ACTOR KEY | ACTOR PORT PRIORITY | ACTOR PORT | ACTOR STATE | RESERVED |
|---|---|---|---|---|---|---|---|---|
| 0X01 (ACTOR INFO) | 0X14 | | | VALUE | | | | |

TLV PARTNER INFORMATION 614b

| TYPE | LENGTH | PARTNER SYSTEM PRIORITY | PARTNER MAC ADDRESS | PARTNER KEY | PARTNER PORT PRIORITY | PARTNER PORT | PARTNER STATE | RESERVED |
|---|---|---|---|---|---|---|---|---|
| 0X02 (PARTNER INFO) | 0X14 | | | VALUE | | | | |

TLV COLLECTOR INFORMATION 614c

| TYPE | LENGTH | COLLECTOR MAX DELAY | RESERVED |
|---|---|---|---|
| 0X03 (COLLECTOR INFO) | 0X10 | | VALUE |

TLV TERMINATOR INFORMATION 614d

| TYPE | LENGTH | PADDING |
|---|---|---|
| 0X00 (TERMINATOR INFO) | 0X00 | VALUE |

TLV ALTERNATE ACTOR INFORMATION 614e

| TYPE | LENGTH | ALTERNATE ACTOR MAC ADDRESS | PADDING (44 BYTES) |
|---|---|---|---|
| 0X04 (ALTERNATE ACTOR INFO) | 0X06 | VALUE | |

AGGREGATED NETWORKING DEVICE FAILOVER SYSTEM

BACKGROUND

The present disclosure relates generally to information handling systems, and more particularly to performing failover operations with aggregated networking information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices and other networking devices known in the art, are sometimes aggregated to provide an aggregated link to those switch devices. For example, the Virtual Link Trunking (VLT) protocol provided in VLT switch devices available from DELL® Inc. of Round Rock, Tex., United States, is a proprietary layer-2 (L2) link aggregation protocol that may provide server devices connected to the VLT switch devices a redundant, load-balancing connection (also called a VLT port channel) to a core network (e.g., via a Top Of Rack (TOR) switch device coupled to the VLT switch devices) in a loop-free environment without the need for the spanning tree protocol, and may also be utilized for uplinks/VLT port channels between the VLT switch devices and the core network (e.g., via the TOR switch device discussed above). Secondary VLT switch devices may be configured to provide for failover in the event of an unavailability of a primary VLT switch device, but such configurations are not mandatory for VLT functionality (e.g., as compared to peer-link port channel configurations, discovery interface configurations, and/or other mandatory VLT configurations known in the art).

For example, VLT switch devices may be optionally configured with an arbitrary VLT Media Access Control (MAC) address that can be used in failover or upgrade situations and, without that VLT MAC address, the VLT port channel provided by the VLT switch devices will "flap" (e.g., transition between "up" and "down") when the primary VLT switch device becomes unavailable and a secondary VLT switch device attempts to perform primary VLT switch device re-election operations. In a specific example in which VLT MAC addresses are not used, a first VLT switch device operating as a primary VLT switch device and a second VLT switch device operating as a secondary VLT switch device are each connected to a TOR switch device. The first VLT switch device may provide a Link Aggregation Control Protocol (LACP) communication to the TOR switch device that provides its MAC address as an "actor" MAC address and the MAC address of the TOR switch device as a "partner" MAC address, and the TOR switch device may respond with an LACP communication to the first VLT switch device that provides its MAC address as an actor MAC address and the MAC address of the first VLT switch device as a partner MAC address. The second VLT switch device may then provide an LACP communication to the TOR switch device that provides the MAC address of the first VLT switch device as an actor MAC address and the MAC address of the TOR switch device as a partner MAC address, and the TOR switch device may respond with an LACP communication to the second VLT switch device that provides the MAC address of the TOR switch device as an actor MAC address and the MAC address of the first VLT switch device as a partner MAC address. As such, a VLT port channel will be established that is bound to the MAC address of the first VLT switch device and that includes ports on each of the first VLT switch device and the second VLT switch device.

In the event the first VLT switch device operating as the primary VLT switch device then becomes unavailable, its port will then be removed from the VLT port channel. The second VLT switch device will then attempt to become the primary VLT switch device by providing an LACP communication to the TOR switch device that provides its MAC address as an actor MAC address and the MAC address of the TOR switch device as a partner MAC address, and the TOR switch device may respond with an LACP communication to the second VLT switch device that provides the MAC address of the TOR switch device as an actor MAC address and the MAC address of the second VLT switch device as a partner MAC address. As will be appreciated by one of skill in the art in possession of the present disclosure, the changing of the LACP communication actor parameters (from the MAC address of the first VLT switch device to the MAC address of the second VLT switch device) will cause the TOR switch device to remove the port on the second VLT switch device from the VLT port channel such that the VLT port channel will no longer be associated with any ports (i.e., the VLT port channel will "flap"/transition from "up" to "down") and cannot transmit data traffic, and will remain that way until a port on the second VLT switch device is added to a VLT port channel that is bound to the MAC address of the second VLT switch device.

In another specific example in which VLT MAC addresses are used to address the issues discussed above, a first VLT switch device operating as a primary VLT switch device and a second VLT switch device operating as a secondary VLT switch device are each connected to a TOR switch device. The first VLT switch device may provide an LACP communication to the TOR switch device that provides the VLT MAC address as an actor MAC address and the MAC address of the TOR switch device as a partner MAC address, and the TOR switch device may respond with an LACP communication to the first VLT switch device that provides its MAC address as an actor MAC address and the VLT MAC address as a partner MAC address. The second VLT switch device may then provide an LACP communication to the TOR switch device that provides the VLT MAC address as an actor MAC address and the MAC address of the TOR switch device as a partner MAC address, and the TOR switch device may respond with an LACP communication to the second VLT switch device that provides the MAC address of the TOR switch device as an actor MAC address and the VLT MAC address as a partner MAC address. As such, a VLT port channel will be established that is bound to the VLT MAC address and that includes ports on each of the first VLT switch device and the second VLT switch device.

Similarly as discussed above in the no-VLT MAC address scenario, in the event the first VLT switch device operating as the primary VLT switch device then becomes unavailable, its port will then be removed from the VLT port channel. However, the second VLT switch device will then attempt to become the primary VLT switch device by providing an LACP communication to the TOR switch device that provides the VLT MAC address as an actor MAC address and the MAC address of the TOR switch device as a partner MAC address, and the TOR switch device may respond with an LACP communication to the second VLT switch device that provides the MAC address of the TOR switch device as an actor MAC address and the VLT MAC address as a partner MAC address. As will be appreciated by one of skill in the art in possession of the present disclosure, the use of the VLT MAC address as discussed above eliminates the changing of the LACP communication actor parameters that occurs when a VLT MAC address is not utilized, and prevents the VLT port channel from "flapping" and the associated interruption in data transmission.

As such, when a primary VLT switch device performs a reboot operation that makes that primary VLT switch device unavailable, the VLT port channel will "flap" unless a network administrator or other user has performed the optional VLT MAC address configuration of the VLT switch devices discussed above. However, performing the optional configuration of the VLT MAC address for each of the VLT switch devices/nodes in an N-node VLT system can be complex and time-consuming. Furthermore, in the case of the manufacture/deployment of an Multi-domain/Extended VLT (E-VLT) topology, different VLT domains must be provided with different VLT MAC addresses, and conventional manufacturing/deployment processes are not able to configure the VLT switch devices with VLT MAC addresses automatically and deploy those VLT switch devices in a manner that ensures VLT switch devices configured with a common VLT MAC address will be utilized together.

Accordingly, it would be desirable to provide an aggregated switch device failover system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an aggregation connected engine that is configured to: receive, from a first aggregated networking device, a first aggregation communication that identifies: a first Media Access Control (MAC) address of the first aggregated networking device as an actor MAC address; and a second MAC address of a second aggregated networking device as an alternate actor MAC address, wherein the second aggregated networking device is aggregated with the first aggregated networking device and the second MAC address is different than the first MAC address; associate the first MAC address and the second MAC address with an aggregated link to the first aggregated networking device and the second aggregated networking device; and receive, from the second aggregated networking device subsequent to associating the first MAC address and the second MAC address with the aggregated link, a second aggregation communication that identifies the second MAC address as an actor MAC address, wherein the aggregated link remains available in response to the second MAC address that is identified as the actor MAC address being associated with the aggregated link.

BRIEF DESCRIPTION OF THE DRAWINGS

FIG. 6 is a schematic view illustrating an embodiment of an aggregation communication that may be transmitted in the aggregated networking device system of FIG. 2 during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
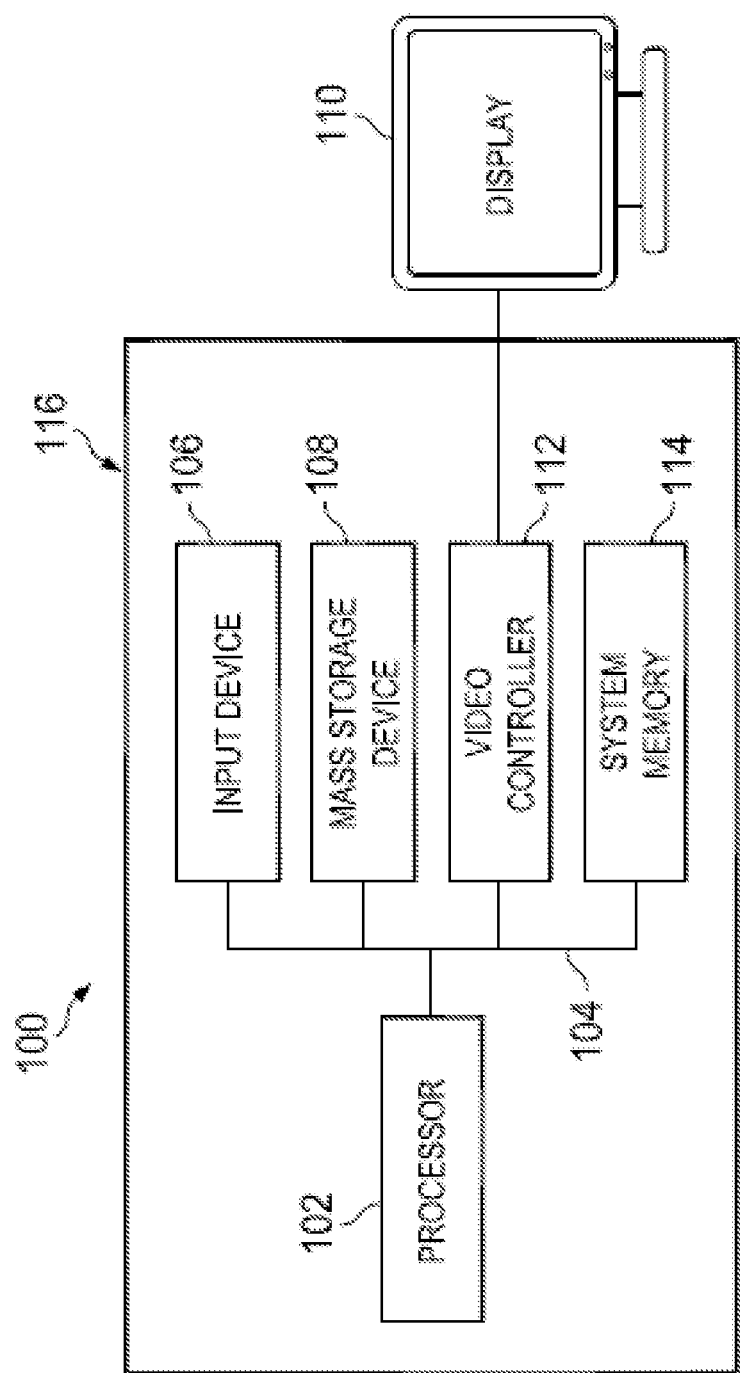
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
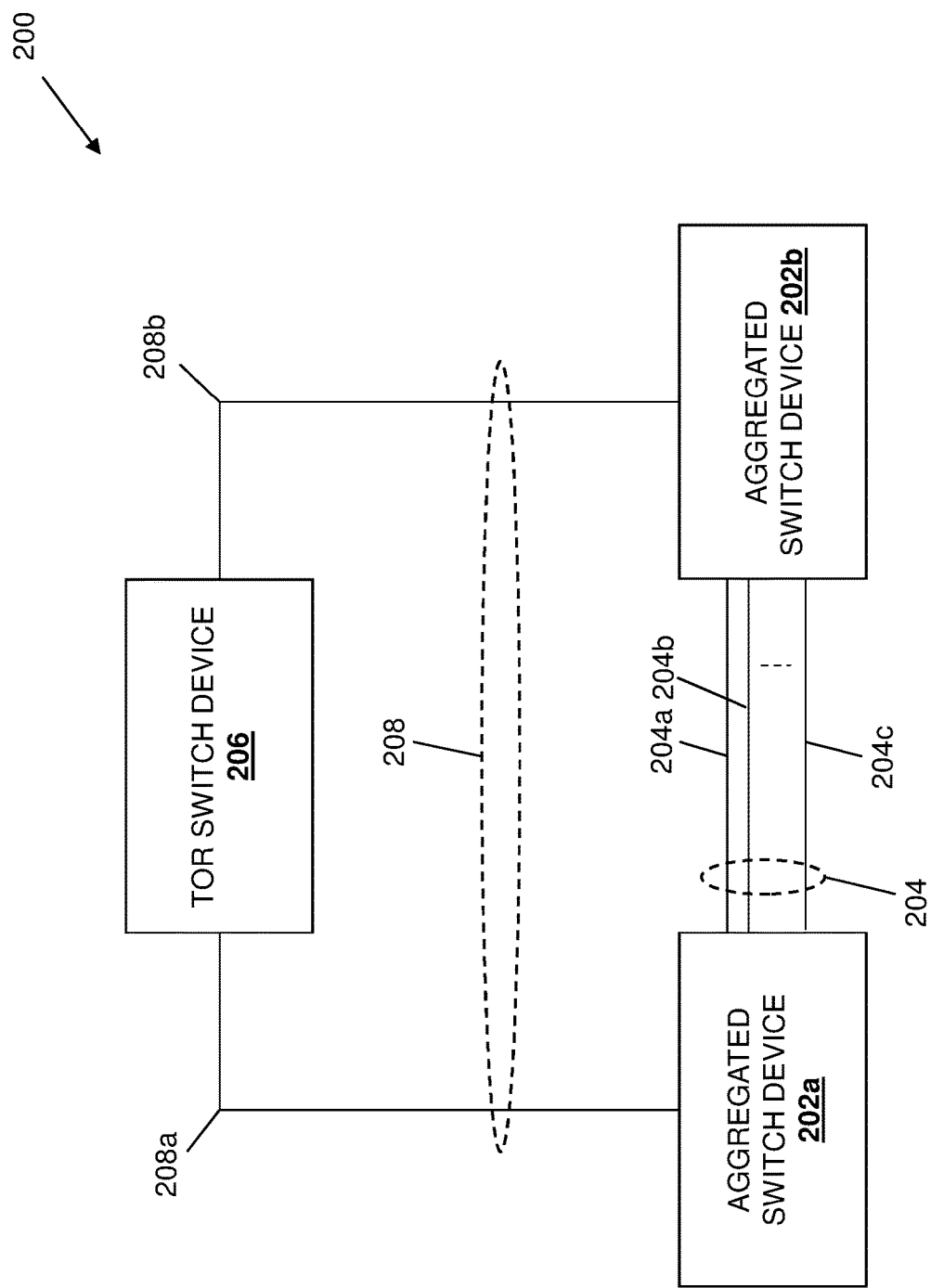
FIG. 2 is a schematic view illustrating an embodiment of an aggregated networking device system that may utilize the aggregated networking device failover system of the present disclosure.

Referring now to FIG. 2, an embodiment of an aggregated networking device system 200 is illustrated. In the illustrated embodiment, the aggregated networking device system 200 includes a pair of aggregated switch devices 202a and 202b. In an embodiment, either or both of the aggregated switch devices 202a and 202b may be provided by the IHS 100 discussed above with reference to FIG. 1, and/or may include some or all of the components of the IHS 100, and in specific examples may be provided by switch devices that are configured to operate according to the VLT protocol utilized in switch devices available from DELL® Inc., of Round Rock, Tex., United States. However, while illustrated and discussed as being provided by switch devices that are configured to operate according to a particular aggregation protocol, one of skill in the art in possession of the present disclosure will recognize that aggregated networking devices provided in the aggregated networking device system 200 may include any networking devices that may utilize any aggregation protocols that configure them to operate similarly as the aggregated switch devices 202a and 202b discussed below. As illustrated in FIG. 2, the aggregated switch devices 202a and 202b may be coupled together by an Inter-Chassis Link (ICL) 204 that may be provided by a plurality of aggregated links 204a, 204b, and up to 204c.

The aggregated networking device system 200 also includes an aggregation connected device that is illustrated and described below as a Top Of Rack (TOR) switch device 206. In an embodiment, the TOR switch devices 206 may be provided by the IHS 100 discussed above with reference to FIG. 1, and/or may include some or all of the components of the IHS 100, and in specific examples may be provided by a TOR switch device that may be included in a rack and that may couple the aggregated switch devices 202a and 202b to a core network (not illustrated). However, while illustrated and discussed as being provided by TOR switch device, one of skill in the art in possession of the present disclosure will recognize that TOR switch device in the aggregated networking device system 200 may be replaced with other aggregation connected devices (e.g., server devices coupled to the aggregated switch devices 202a and 202b) that may be configured to operate similarly as the TOR switch device 206 discussed below. As illustrated, the TOR switch device 206 may be coupled to the aggregated switch device 202a by one or more links 208a, and may be coupled to the aggregated switch device 202b by one or more links 208b, and the links 208a and 208b may be aggregated to provide an aggregated link 208 (e.g., a VLT port channel in embodiments of the present disclosure that utilize the VLT protocol). However, while a specific aggregated networking device system 200 has been illustrated and described, one of skill in the art in possession of the present disclosure will recognize that the aggregated networking device failover system of the present disclosure may include a variety of components and component configurations while remaining within the scope of the present disclosure as well.

Figure 3:
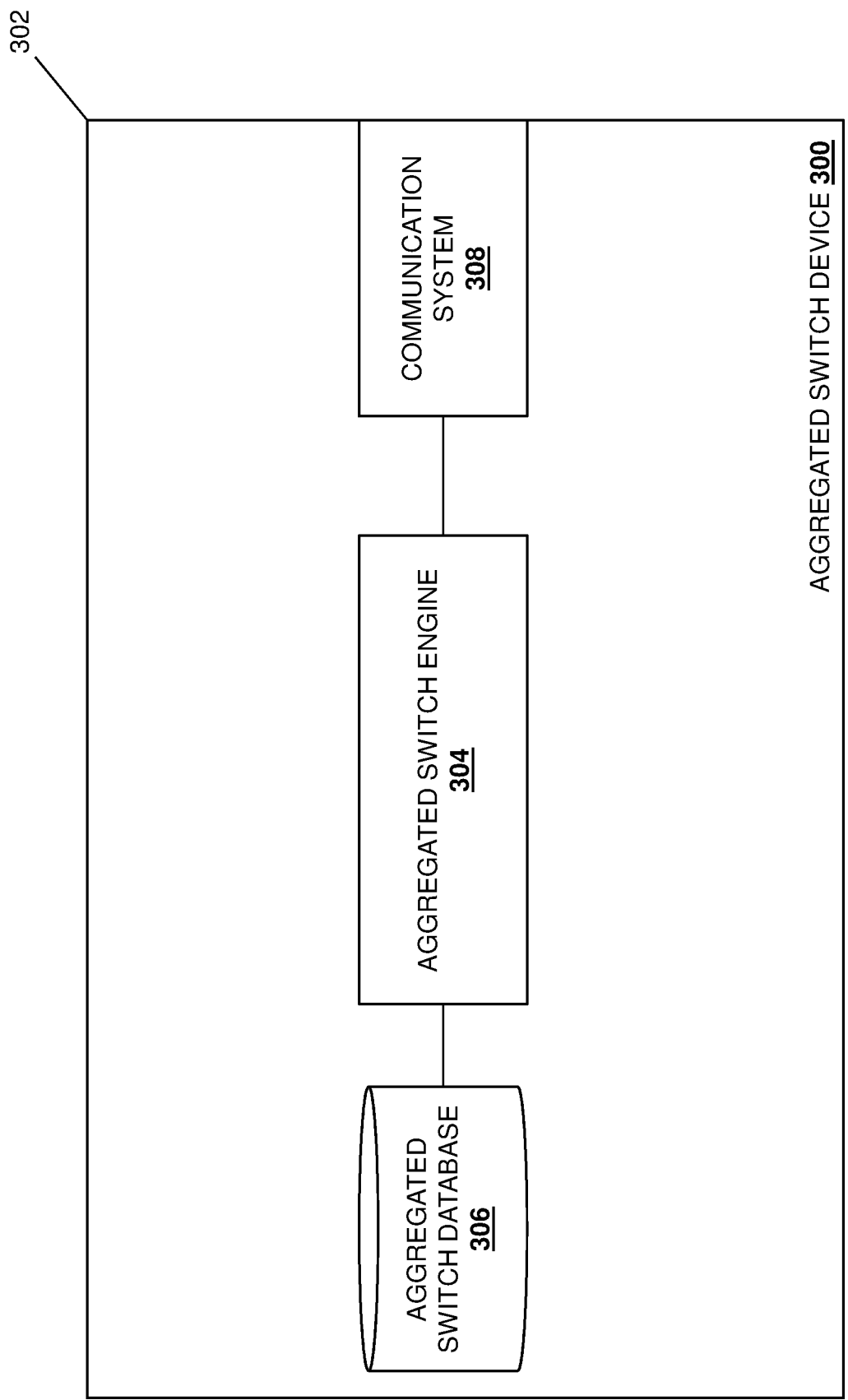
FIG. 3 is a schematic view illustrating an embodiment of an aggregated networking device that may be provided in the aggregated networking device system of FIG. 2.

Referring now to FIG. 3, an embodiment of an aggregated switch device 300 is illustrated that may provide either or both of the aggregated switch devices 202a and 202b discussed above with reference to FIG. 2. As such, the aggregated switch device 300 may be provided by the IHS 100 discussed above with reference to FIG. 1 and/or may include some or all of the components of the IHS 100, and in specific examples may be provided by a switch device that is configured to operate according to the VLT protocol utilized in switch devices available from DELL® Inc., of Round Rock, Tex., United States. However, while illustrated and discussed as a switch device configured to operate according to a particular protocol, one of skill in the art in possession of the present disclosure will recognize that the functionality of the aggregated switch device 300 discussed below may be provided by other devices that are configured to operate similarly as the aggregated switch device 300 discussed below. In the illustrated embodiment, the aggregated switch device 300 includes a chassis 302 that houses the components of the aggregated switch device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an aggregated switch engine 304 that is configured to perform the functionality of the aggregated switch engines and/or aggregated switch devices discussed below. One of skill in the art in possession of the present disclosure will appreciate that, in some embodiments, the functionality of the aggregated switch engine discussed below may be provided via modifications to a conventional LACP transmission (TX) state machine included in the aggregated switch device 300, and may not require any modifications to a conventional LACP receiving (RX) state machine included in the aggregated switch device 300.

The chassis 302 may also house a storage system (not illustrated, but which may include the storage 108 discussed above with reference to FIG. 1) that is coupled to the aggregated switch engine 304 (e.g., via a coupling between the storage system and the processing system) and that includes an aggregated switch database 306 that is configured to store any of the information utilized by the aggregated switch engine 304 discussed below. The chassis 302 may also house a communication system 308 that is coupled to the aggregated switch engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific aggregated switch device 300 has been illustrated and described, one of skill in the art in possession of the present disclosure will recognize that aggregated switch devices (or other devices operating according to the teachings of the present disclosure in a manner similar to that described below for the aggregated switch device 300) may include a variety of components and/or component configurations for providing conventional switch device functionality, as well as the functionality discussed below, while remaining within the scope of the present disclosure as well.

Figure 4:
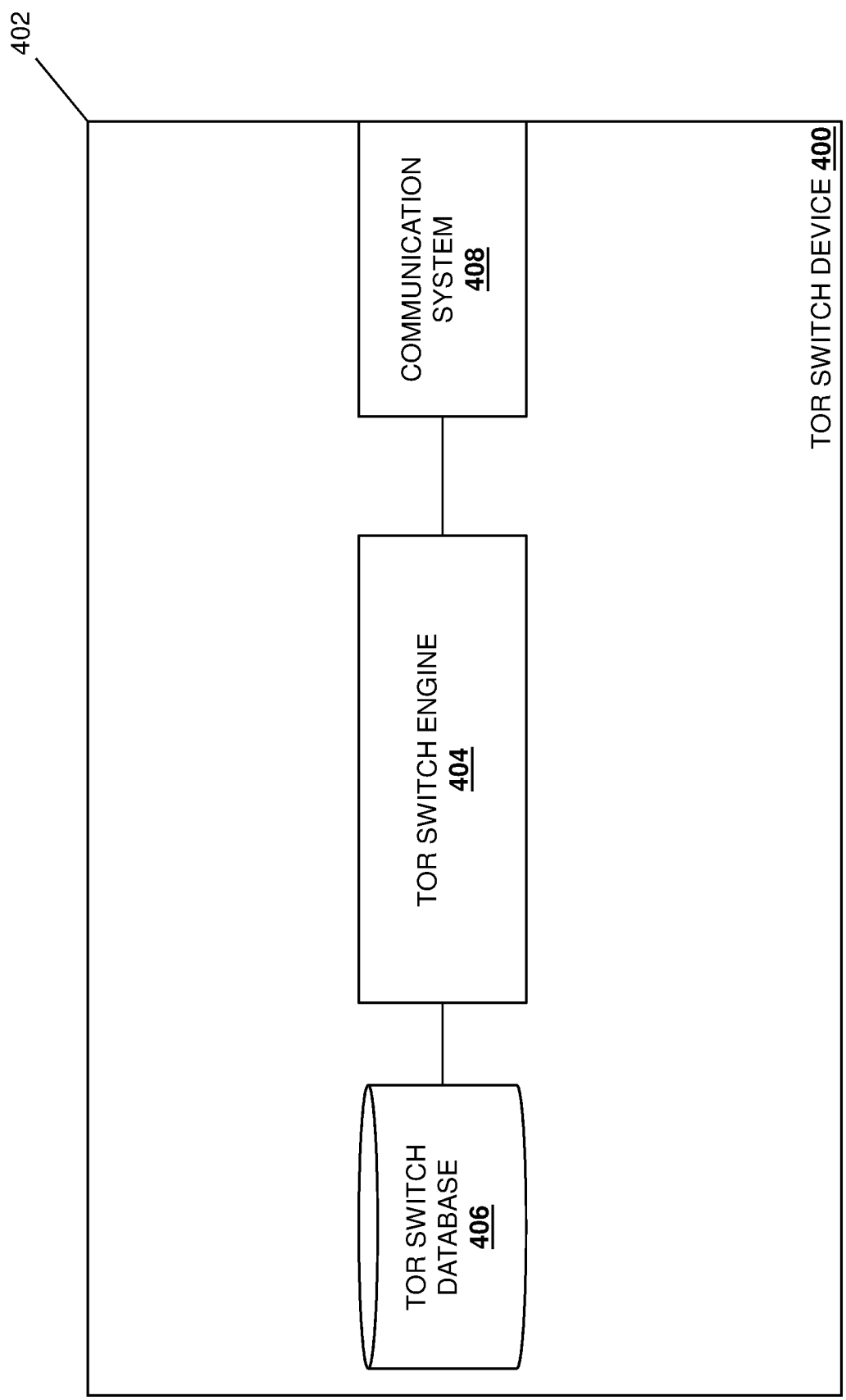
FIG. 4 is a schematic view illustrating an embodiment of a Top Of Rack (TOR) switch device that may be provided in the aggregated networking device system of FIG. 2.

Referring now to FIG. 4, an embodiment of a Top Of Rack (TOR) switch device 400 is illustrated that may provide the TOR switch device 206 discussed above with reference to FIG. 2. As such, the TOR switch device 400 may be provided by the IHS 100 discussed above with reference to FIG. 1 and/or may include some or all of the components of the IHS 100. Furthermore, while illustrated and discussed as being provided by a TOR switch device, one of skill in the art in possession of the present disclosure will recognize that the functionality of the TOR switch device 400 discussed below may be provided by other aggregation connected devices (e.g., server devices) that are configured to operate similarly as the TOR switch device 400 discussed below. In the illustrated embodiment, the TOR switch device 400 includes a chassis 402 that houses the components of the TOR switch device 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a TOR switch engine 404 that is configured to perform the functionality of the aggregation connected engines, TOR switch engines, and/or TOR switch devices discussed below. One of skill in the art in possession of the present disclosure will appreciate that, in some embodiments, the functionality of the TOR switch engine discussed below may be provided via modifications to a conventional LACP receiving (RX) state machine included in the TOR switch device 400, and may not require any modifications to a conventional LACP transmission (TX) state machine included in the TOR switch device 400.

The chassis 402 may also house a storage system (not illustrated, but which may include the storage 108 discussed above with reference to FIG. 1) that is coupled to the TOR switch engine 404 (e.g., via a coupling between the storage system and the processing system) and that includes a TOR switch database 406 that is configured to store any of the information utilized by the TOR switch engine 404 discussed below. The chassis 402 may also house a communication system 408 that is coupled to the TOR switch engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific TOR switch device 400 has been illustrated, one of skill in the art in possession of the present disclosure will recognize that TOR switch devices (or other devices operating according to the teachings of the present disclosure in a manner similar to that described below for the TOR switch device 400) may include a variety of components and/or component configurations for providing conventional switch device functionality, as well as the functionality discussed below, while remaining within the scope of the present disclosure as well.

Figure 5:
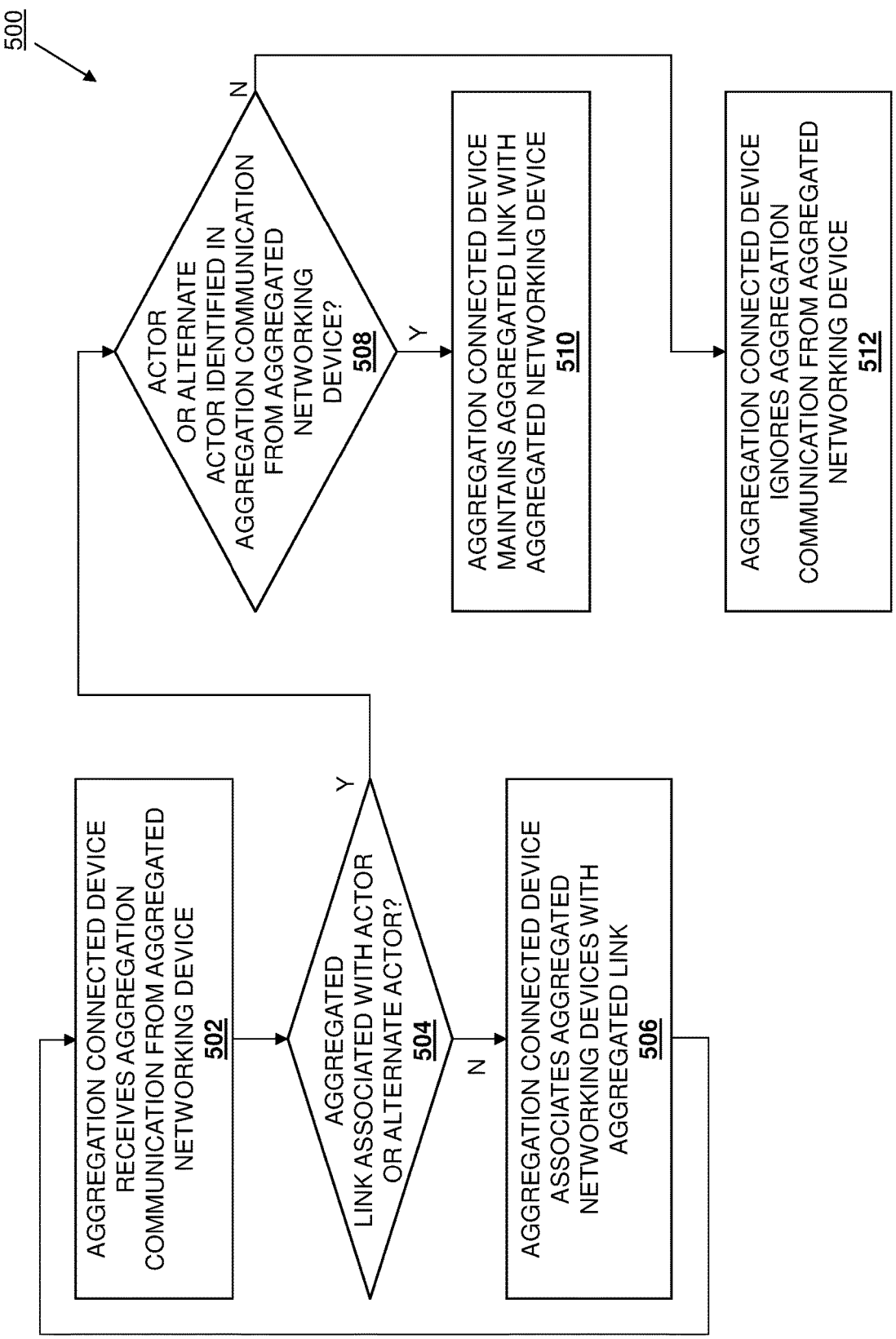
FIG. 5 is a flow chart illustrating an embodiment of a method for performing failover operations with aggregated networking devices.

Referring now to FIG. 5, an embodiment of a method 500 for performing failover operations with aggregated networking devices is illustrated. As discussed below, the systems and methods of the present disclosure provide for the identification of an actor and alternate actor for an aggregated link by aggregated networking devices associated with that aggregated link, which allows that aggregated link to remain available when a primary aggregated networking device identified as the actor becomes unavailable and the secondary aggregated networking device identified as the alternate actor performs failover operations and becomes a primary aggregated networking device. For example, the aggregated networking device failover system of the present disclosure includes an aggregation connected device coupled to first and second aggregated networking devices. The aggregation connected device receives a first aggregation communication from the first aggregated networking device that identifies a first MAC address of the first aggregated networking device as an actor MAC address, and a second MAC address of the second aggregated networking device as an alternate actor MAC address. The aggregation connected device then associates the first and second MAC addresses with an aggregated link to the first and second aggregated networking devices. Subsequent to associating the first and second MAC addresses with the aggregated link, the aggregation connected device receives a second aggregation communication from the second aggregated networking device that identifies the second MAC address of the second aggregated networking device as an actor MAC address, and the aggregated link remains available in response to that second MAC address/actor MAC address being associated with the aggregated link. As such, aggregated link "flapping" is eliminated in aggregated networking device failover scenarios without the need to configure each aggregated networking device with a common aggregation MAC address.

With reference to FIG. 6, an embodiment of an aggregation communication 600 is illustrated that may be utilized during the method 500 as discussed below. One of skill in the art in possession of the present disclosure will recognize that the aggregation communication 600 illustrated in FIG. 6 is a modified Link Aggregation Control Protocol (LACP) aggregation communication, but may be provided by another aggregation communications while remaining within the scope of the present disclosure as well. As illustrated in FIG. 6, the aggregation communication 600 may include a preamble 602, a destination Media Access Control (MAC) address 604, a source MAC address 606, an ether type 608, a sub type 610, an LACP version 612, a Type-Length-Value (TLV) data structure 614, and a Frame Check Sequence (FCS) 616. Furthermore, FIG. 6 illustrates how the TLV data structure 614 includes TLV actor information 614a that includes a type section that identifies actor information (e.g., 0x01), a length section (e.g., 0x14), and a value section that identifies an actor system priority, an actor MAC address, an actor key, an actor port priority, an actor port, and an actor state, and includes a reserved section. The TLV data structure 614 also includes TLV partner information 614b that includes a type section that identifies partner information (e.g., 0x02), a length section (e.g., 0x14), and a value section that identifies a partner system priority, a partner MAC address, a partner key, a partner port priority, a partner port, and a partner state, and includes a reserved section.

The TLV data structure 614 also includes TLV collector information 614c that includes a type section that identifies collector information (e.g., 0x03), a length section (e.g., 0x10), and a value section that identifies a collector maximum delay and includes a reserved section. The TLV data structure 614 also includes TLV terminator information 614d that includes a type section that identifies terminator information (e.g., 0x00), a length section (e.g., 0x00), and a value section that includes padding (e.g., typically around 50 bytes of space). The TLV data structure 614 also includes TLV alternate actor information 614e that identifies alternate actor information (e.g., 0x04), a length section (e.g., 0x06), and a value section that identifies an alternate actor MAC address and that may include padding, and one of skill in the art in possession of the present disclosure will appreciate that the TLV alternate actor information 614e in the TLV data structure 614 provides a modification to conventional TLV data structures in conventional LACP aggregation communications. In an embodiment, the aggregated networking device failover system of the present disclosure may utilize the padding in the value section of the TLV terminator information 614d to provide the TLV alternate actor information 614e (e.g., with approximately 44 bytes in the padding in the TLV alternate actor information 614e being the portion of the padding from the TLV terminator information 614d that is not used for the TLV alternate actor information 614e). However, while a particular aggregation communication is illustrated and described herein, one of skill in the art in possession of the present disclosure will appreciate how the aggregated networking device failover functionality may be accomplished using other communications and/or communication data structures while remaining within the scope of the present disclosure as well.

Figure 7A:
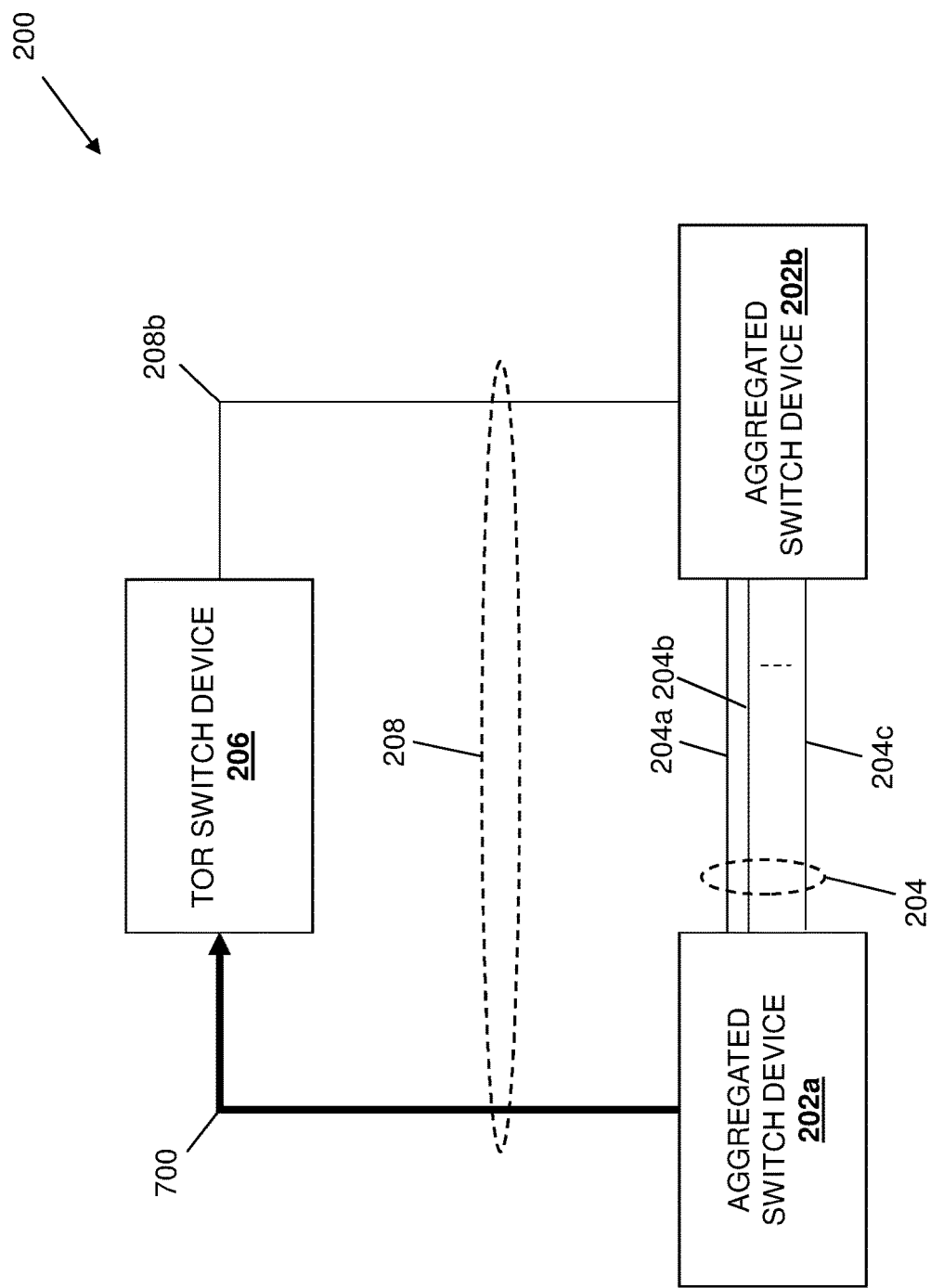
FIG. 7A is a schematic view illustrating an embodiment of the operation of the aggregated networking device system of FIG. 2 during the method of FIG. 5.

The method 500 begins at block 502 where an aggregation connected device receives an aggregation communication from an aggregated networking device. In an embodiment, at block 502, the aggregated networking devices 202a and 202b may generate and transmit aggregation communications to the TOR switch device 206. For example, with reference to FIG. 7A, the aggregated switch engine 304 in the aggregated networking device 202a/300 may generate an aggregation communication and may perform aggregation communication transmission operations 700 that include transmitting the aggregation communication via its communication system 308 and through the link(s) 208a such that the aggregation communication is received by the TOR switch engine 404 in the TOR switch device 206/400 via its communication system 408.

In embodiments in which the aggregation communication 600 discussed above with reference to FIG. 6 is utilized, the aggregation communication received by the TOR switch device 206/400 from the aggregated networking device 202a/300 at block 502 may identify a MAC address of the aggregated networking device 202a as the actor MAC address in the value section of the TLV actor information 614a, a MAC address of the TOR switch device 206/400 as the partner MAC address in the value section of the TLV partner information 614b, and a MAC address of the aggregated networking device 202b/300 as the alternate actor MAC address in the value section of the TLV alternate actor information 614e. Furthermore, while not discussed above, the aggregation communication received by the TOR switch device 206/400 from the aggregated networking device 202a/300 at block 502 may include any of the other information discussed above with reference to FIG. 6 as well.

Figure 8A:
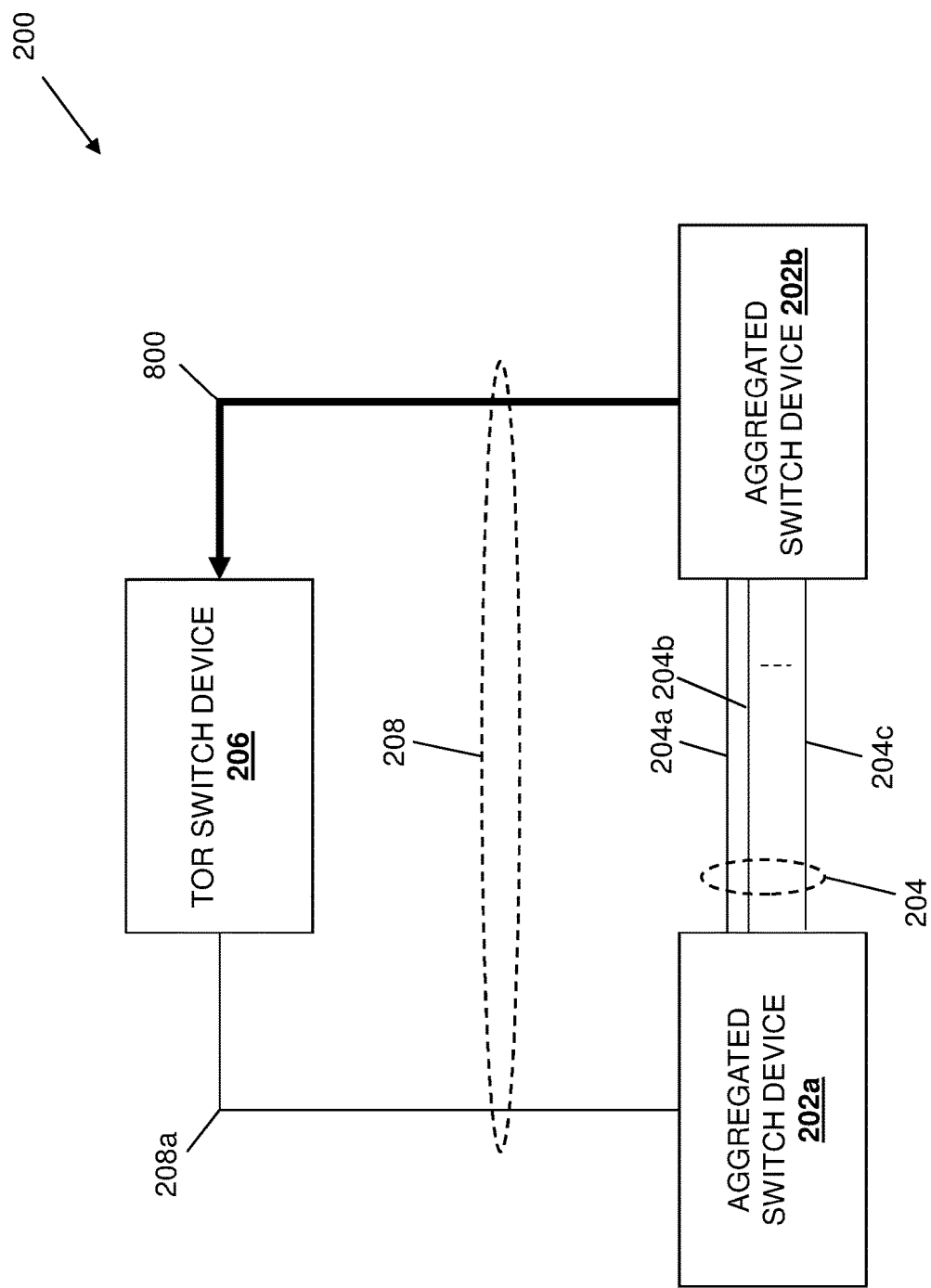
FIG. 8A is a schematic view illustrating an embodiment of the operation of the aggregated networking device system of FIG. 2 during the method of FIG. 5.

In another example, with reference to FIG. 8A, the aggregated switch engine 304 in the aggregated networking device 202b/300 may generate an aggregation communication and may perform aggregation communication transmission operations 800 that include transmitting the aggregation communication via its communication system 308 and through the link(s) 208b such that the aggregation communication is received by the TOR switch engine 404 in the TOR switch device 206/400 via its communication system 408. In embodiments in which the aggregation communication 600 discussed above with reference to FIG. 6 is utilized, the aggregation communication received by the TOR switch device 206/400 from the aggregated networking device 202b/300 at block 502 may identify a MAC address of the aggregated networking device 202b as the actor MAC address in the value section of the TLV actor information 614a, a MAC address of the TOR switch device 206/400 as the partner MAC address in the value section of the TLV partner information 614b, and a MAC address of the aggregated networking device 202a/300 as the alternate actor MAC address in the value section of the TLV alternate actor information 614e. Furthermore, while not discussed above, the aggregation communication received by the TOR switch device 206/400 from the aggregated networking device 202b/300 at block 502 may include any of the other information discussed above with reference to FIG. 6 as well.

As will be appreciated by one of skill in the art in possession of the present disclosure, while the examples below describe the identification of alternate actors in aggregation communications, the TOR switch device 206/400 of the present disclosure may be configured to receive aggregation communications that do not identify an alternate actor, and may operate to handle those aggregation communications in a conventional manner and similarly as described above.

The method 500 then proceeds to decision block 504 where it is determined whether an aggregated link is associated with an actor or alternate actor. In an embodiment, at decision block 504 and in response to receiving the aggregation communication, the TOR switch engine 404 in the TOR switch device 206/400 may determine whether an aggregated link coupling the TOR switch device 206/400 to the aggregated networking devices 202a and 202b is associated with an actor MAC address or an alternate actor MAC address in its TOR switch database 406. As discussed below, the aggregated networking devices 202a and 202b may have each previously identified their own MAC address as an actor MAC address and the MAC address of the other aggregated networking device as an alternate actor MAC address to the TOR switch device 206 in order to have that actor MAC address and alternate actor MAC address associated with a aggregated link to the TOR switch device 206 (e.g., in the TOR switch database 406), and thus the TOR switch engine 404 in the TOR switch device 206/400 may check the TOR switch database 406 for the association of an actor MAC address and alternate actor MAC address with that aggregated link upon receiving an aggregation communication.

If, at decision block 504, it is determined that an aggregated link is not associated with an actor or alternate actor, the method 500 proceeds to block 506 where the aggregation connected device associates the aggregated networking devices with an aggregated link. Continuing with the example in which the aggregation communication was received from the aggregated networking device 202a and in embodiments in which the aggregation communication 600 discussed above with reference to FIG. 6 is utilized, at block 506 and in response to determining that an aggregated link is not associated with an actor or alternate actor in its TOR switch database 406 at decision block 504, the TOR switch engine 404 in the TOR switch device 206/400 may associate the aggregated networking devices 202a and 202b with the aggregated link 208 that will be provided by the links 208a and 208b by associating that aggregated link 208 with the actor MAC address provided in the value section of the TLV actor information 614a included in the aggregation communication received from the aggregated networking device 202a (i.e., the MAC address of the aggregated networking device 202a in this example) in its TOR switch database 406, and by associating the aggregated link 208 with the alternate actor MAC address provided in the value section of the TLV alternate actor information 614e included in the aggregation communication received from the aggregated networking device 202a (i.e., the MAC address of the aggregated networking device 202b in this example) in its TOR switch database 406.

Figure 7B:
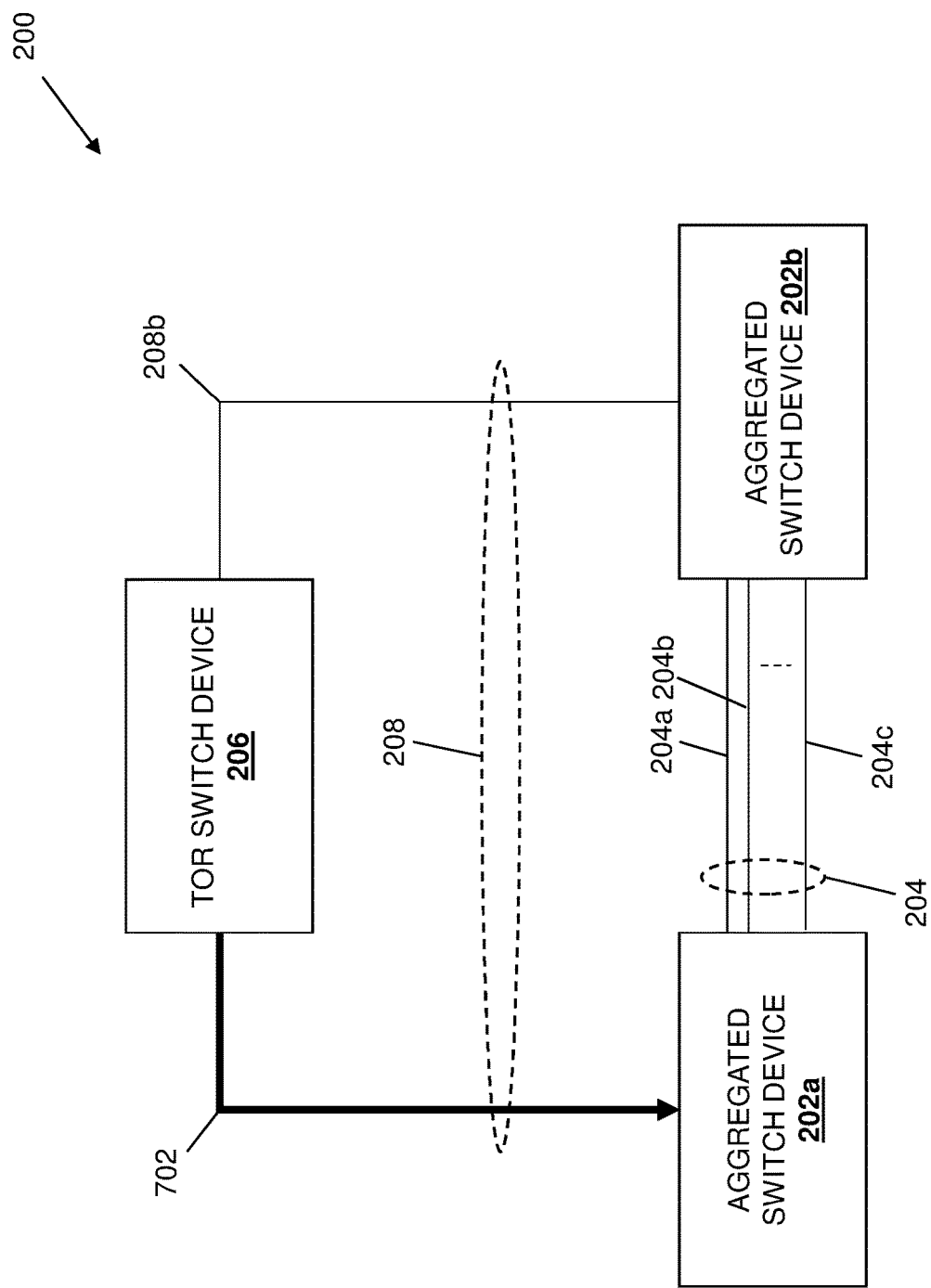
FIG. 7B is a schematic view illustrating an embodiment of the operation of the aggregated networking device system of FIG. 2 during the method of FIG. 5.

Furthermore, with reference to FIG. 7B, the TOR switch engine 404 in the TOR switch device 206/400 may generate an aggregation communication and may perform aggregation communication transmission operations 702 that include transmitting the aggregation communication via its communication system 408 and to the aggregated switch device 202a. In embodiments in which the aggregation communication 600 discussed above with reference to FIG. 6 is utilized, the aggregation communication transmitted by the TOR switch device 206/400 to the aggregated networking device 202a/300 at block 506 may identify a MAC address of the TOR switch device 206/400 as the actor MAC address in the value section of the TLV actor information 614a, and a MAC address of the aggregated networking device 202a as the partner MAC address in the value section of the TLV partner information 614b. Furthermore, while not discussed above, the aggregation communication transmitted by the TOR switch device 206/400 to the aggregated networking device 202a/300 at block 506 may include any of the other information discussed above with reference to FIG. 6 as well. Following the association of the aggregated link 208 with the link 208a to the aggregated networking device 202a in response to the aggregation communication transmission operation 700, as well as the association of the aggregated link 208 with link 208b to the aggregated networking device 202b in response to the aggregation communication transmission operation 800, the links 208a and 208b are aggregated to provide the aggregated link 208, and that aggregated link 208 may be utilized to transmit data between the aggregated networking devices 202a/202b and the TOR switch device 206. The method 500 may then return to block 502.

Continuing with the example in which the aggregation communication was received from the aggregated networking device 202b and in embodiments in which the aggregation communication 600 discussed above with reference to FIG. 6 is utilized, at block 506 and in response to determining that an aggregated link is not associated with an actor or alternate actor in its TOR switch database 406 at decision block 504, the TOR switch engine 404 in the TOR switch device 206/400 may associate the aggregated networking devices 202a and 202b with the aggregated link 208 that will be provided by the links 208a and 208b by associating the aggregated link 208 with the actor MAC address provided in the value section of the TLV actor information 614a included in the aggregation communication received from the aggregated networking device 202b (i.e., the MAC address of the aggregated networking device 202b in this example) in its TOR switch database 406, and by associating the aggregated link 208 with the alternate actor MAC address provided in the value section of the TLV alternate actor information 614e included in the aggregation communication received from the aggregated networking device 202b (i.e., the MAC address of the aggregated networking device 202a in this example) in its TOR switch database 406.

Figure 8B:
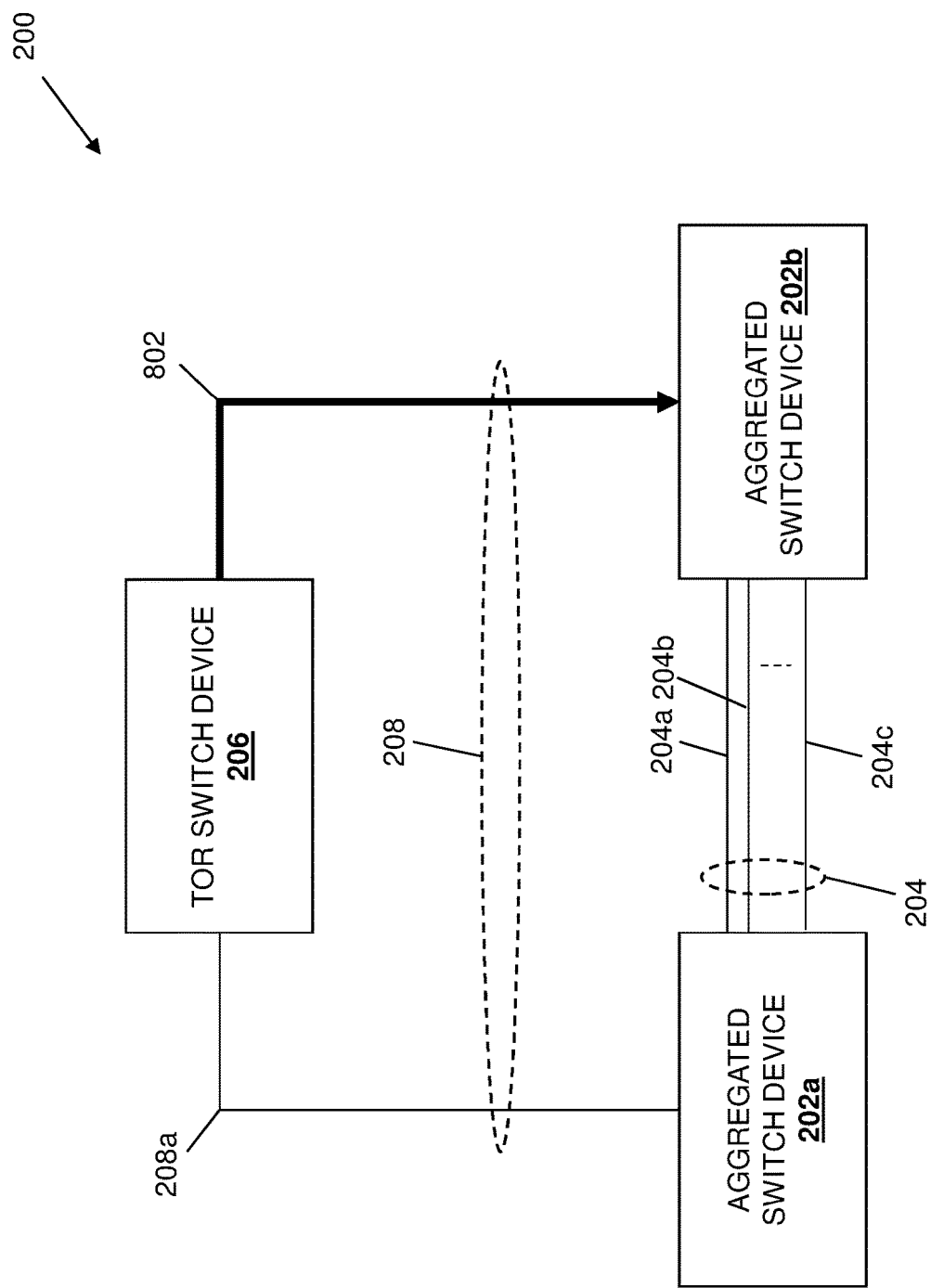
FIG. 8B is a schematic view illustrating an embodiment of the operation of the aggregated networking device system of FIG. 2 during the method of FIG. 5.

Furthermore, with reference to FIG. 8B, the TOR switch engine 404 in the TOR switch device 206/400 may generate an aggregation communication and may perform aggregation communication transmission operations 802 that include transmitting the aggregation communication via its communication system 408 and to the aggregated switch device 202a. In embodiments in which the aggregation communication 600 discussed above with reference to FIG. 6 is utilized, the aggregation communication transmitted by the TOR switch device 206/400 to the aggregated networking device 202b/300 at block 506 may identify a MAC address of the TOR switch device 206/400 as the actor MAC address in the value section of the TLV actor information 614a, and a MAC address of the aggregated networking device 202b as the partner MAC address in the value section of the TLV partner information 614b. Furthermore, while not discussed above, the aggregation communication transmitted by the TOR switch device 206/400 to the aggregated networking device 202b/300 at block 506 may include any of the other information discussed above with reference to FIG. 6 as well. Following the association of the aggregated link 208 with the link 208b to the aggregated networking device 202b in response to the aggregation communication transmission operation 800, as well as the association of the aggregated link 208 with link 208a to the aggregated networking device 202a in response to the aggregation communication transmission operation 700, the links 208a and 208b are aggregated to provide the aggregated link 208, and that aggregated link 208 may be utilized to transmit data between the aggregated networking devices 202a/202b and the TOR switch device 206. The method 500 may then return to block 502.

If, at decision block 504, it is determined that an aggregated link is associated with an actor or alternate actor, the method 500 proceeds to decision block 508 where it is determined whether the actor or alternate actor associated with the aggregated link correspond to the actor or alternate actor identified in the aggregation communication from the aggregated networking device. In an embodiment, at decision block 508 and in response to determine that the aggregated link 208 coupling the TOR switch device 206/400 to the aggregated networking devices 202a and 202b is associated with an actor or alternate actor in its TOR switch database 406, the TOR switch engine 404 in the TOR switch device 206/400 may determine whether the actor or alternate actor identified in the aggregation communication received at block 502 corresponds to the actor or alternate actor associated with the aggregated link 208.

Continuing with the example in which the aggregation communication was received from the aggregated networking device 202a and in embodiments in which the aggregation communication 600 discussed above with reference to FIG. 6 is utilized, at decision block 508 and in response to determining that the aggregated link 208 is associated with an actor or alternate actor in its TOR switch database 406 at decision block 504, the TOR switch engine 404 in the TOR switch device 206/400 may determine whether the actor MAC address provided in the value section of the TLV actor information 614a included in the aggregation communication received from the aggregated networking device 202a (i.e., the MAC address of the aggregated networking device 202a in this example) matches the actor MAC address or alternate actor MAC address associated with the aggregated link 208 in its TOR switch database 406

Continuing with the example in which the aggregation communication was received from the aggregated networking device 202b and in embodiments in which the aggregation communication 600 discussed above with reference to FIG. 6 is utilized, at decision block 508 and in response to determining that the aggregated link 208 is associated with an actor or alternate actor in its TOR switch database 406 at decision block 504, the TOR switch engine 404 in the TOR switch device 206/400 may determine whether the actor MAC address provided in the value section of the TLV actor information 614a included in the aggregation communication received from the aggregated networking device 202b (i.e., the MAC address of the aggregated networking device 202b in this example) matches the actor MAC address or alternate actor MAC address associated with the aggregated link 208 in its TOR switch database 406.

If, at decision block 508, it is determined that the actor or alternate actor associated with the aggregated link correspond to the actor or alternate actor identified in the aggregation communication from the aggregated networking device, the method 500 proceeds to block 510 where the aggregation connected device maintains the aggregated link with the aggregated networking device. Continuing with the example in which the aggregation communication was received from the aggregated networking device 202a and in embodiments in which the aggregation communication 600 discussed above with reference to FIG. 6 is utilized, at block 510 and in response to determining that the actor or alternate actor associated with the aggregated link 208 correspond to the actor or alternate actor identified in the aggregation communication from the aggregated networking device 202a at decision block 508, the TOR switch engine 404 in the TOR switch device 206/400 may maintain the aggregate link 208 with the aggregated networking device 202a.

Furthermore, with reference back to FIG. 7B, the TOR switch engine 404 in the TOR switch device 206/400 may then generate an aggregation communication and may perform the aggregation communication transmission operations 702 similarly as discussed above that include transmitting the aggregation communication via its communication system 408 and to the aggregated switch device 202a. In embodiments in which the aggregation communication 600 discussed above with reference to FIG. 6 is utilized, the aggregation communication transmitted by the TOR switch device 206/400 to the aggregated networking device 202a/300 at block 510 may identify a MAC address of the TOR switch device 206/400 as the actor MAC address in the value section of the TLV actor information 614a, and a MAC address of the aggregated networking device 202a as the partner MAC address in the value section of the TLV partner information 614b. Furthermore, while not discussed above, the aggregation communication transmitted by the TOR switch device 206/400 to the aggregated networking device 202a/300 at block 510 may include any of the other information discussed above with reference to FIG. 6 as well. As such, at block 510, the aggregated link 208 may be utilized to transmit data between the aggregated networking device 202a and the TOR switch device 206.

Continuing with the example in which the aggregation communication was received from the aggregated networking device 202b and in embodiments in which the aggregation communication 600 discussed above with reference to FIG. 6 is utilized, at block 510 and in response to determining that the actor or alternate actor associated with the aggregated link 208 correspond to the actor or alternate actor identified in the aggregation communication from the aggregated networking device 202b at decision block 508, the TOR switch engine 404 in the TOR switch device 206/400 may maintain the aggregate link 208 with the aggregated networking device 202b.

Furthermore, with reference back to FIG. 8B, the TOR switch engine 404 in the TOR switch device 206/400 may then generate an aggregation communication and may perform aggregation communication transmission operations 802 that include transmitting the aggregation communication via its communication system 408 and to the aggregated switch device 202b. In embodiments in which the aggregation communication 600 discussed above with reference to FIG. 6 is utilized, the aggregation communication transmitted by the TOR switch device 206/400 to the aggregated networking device 202b/300 at block 510 may identify a MAC address of the TOR switch device 206/400 as the actor MAC address in the value section of the TLV actor information 614a, and a MAC address of the aggregated networking device 202b as the partner MAC address in the value section of the TLV partner information 614b. Furthermore, while not discussed above, the aggregation communication transmitted by the TOR switch device 206/400 to the aggregated networking device 202b/300 at block 510 may include any of the other information discussed above with reference to FIG. 6 as well. As such, at block 510, the aggregated link 208 may be utilized to transmit data between the aggregated networking device 202b and the TOR switch device 206.

If, at decision block 508, it is determined that the actor or alternate actor associated with the aggregated link does not correspond to the actor or alternate actor identified in the aggregation communication from the aggregated networking device, the method 500 proceeds to block 512 where the aggregation connected device ignores the aggregation communication from the aggregated networking device. In an embodiment, at block 512 and in response to determining that the actor or alternate actor associated with the aggregated link 208 do not correspond to the actor or alternate actor identified in the aggregation communication from the aggregated networking device 202a or 202b at decision block 508, the TOR switch engine 404 in the TOR switch device 206/400 with ignore the aggregation communication received from the aggregated networking device 202a or 202b at block 502 (e.g., that link will not be included in the aggregated link 208, preventing data packets from being transmitted via that link, while allowing control packets (e.g., LLDP control packets, LACP control packets, etc.).

Figure 9:
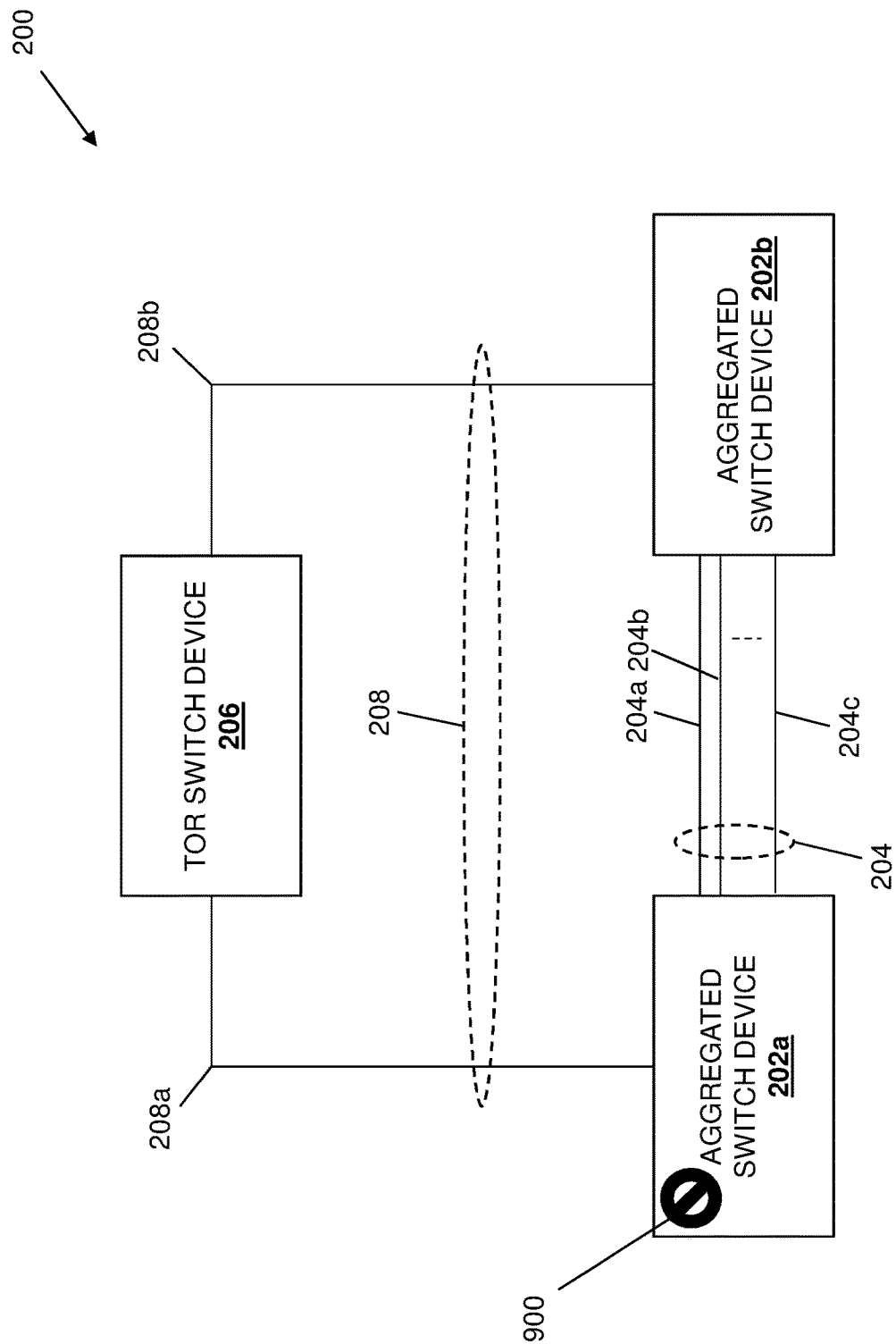
FIG. 9 is a schematic view illustrating an embodiment of the operation of the aggregated networking device system of FIG. 2 during the method of FIG. 5.

With reference to FIG. 9, an example of the performance of the method 500 is provided below to illustrate how the aggregated networking device failover system of the present disclosure addresses the issues with conventional aggregated networking device failover systems discussed above. In this example, the aggregated switch device 202a is initially configured as a primary aggregated switch device and the aggregated switch device 202b is initially configured as a secondary aggregated switch device. At block 502, the aggregated switch device 202a may provide an aggregation communication to the TOR switch device 206 that provides the MAC address of the aggregated switch device 202a as an actor MAC address, the MAC address of the aggregated switch device 202b as an alternate actor MAC address, and the MAC address of the TOR switch device 206 as a partner MAC address. At decision block 504, the TOR switch device 206 may determine that an aggregated link is not associated with an actor or alternate actor, and may proceed to block 506 to associate the actor MAC address (e.g., the MAC address of the aggregated switch device 202a in this example) and the alternate actor MAC address (e.g., the MAC address of the aggregated switch device 202b in this example) with the aggregated link 208. The TOR switch device 206 may then respond with an aggregation communication to the aggregated switch device 202a that provides MAC address of the TOR switch device 206 as an actor MAC address, and the MAC address of the aggregated switch device 202a as a partner MAC address.

In the event the aggregated switch device 202a operating as the primary VLT switch device then becomes unavailable (as illustrated by element 900 in FIG. 9), its port(s) will be removed from the aggregated link 208. The aggregated switch device 202b will then attempt to become the primary aggregated switch device by providing an aggregation communication to the TOR switch device 206 at block 502 that provides the MAC address of the aggregated switch device 202b as an actor MAC address and the MAC address of the TOR switch device 206 as a partner MAC address. At decision block 504, the TOR switch device 206 may determine that the aggregated link 208 is associated with an actor and alternate actor, and the method 500 may proceed to decision block 508 where the TOR switch device 206 will match the actor MAC address provided by the aggregated switch device 202b (i.e., the MAC address of the aggregated switch device 202b) with the alternate actor MAC address previously provided by the aggregated switch device 202a and associated with the aggregated link 208 (i.e., the MAC address of the aggregated switch device 202b), and thus the TOR switch device 206 will maintain the aggregated link 208 with the aggregated networking device 202b at block 510, and may respond with an aggregation communication to the aggregated switch device 202b that provides the MAC address of the TOR switch device as an actor MAC address and the MAC address of the aggregated switch device 202b as a partner MAC address. Furthermore, in some embodiments, the TOR switch device 206 may then replace the actor MAC address previously provided by the aggregated switch device 202a with the actor MAC address provided by the aggregated switch device 202b. As such, the association of the aggregated link 208 with an actor MAC address and alternate actor MAC address prevents the aggregated link 208 from "flapping" (and the associated interruption in data transmission) during failover operations without the need to configure each of the aggregated switch devices 202a and 202b with a common MAC address like the VLT MAC address discussed above.

Figure 10:
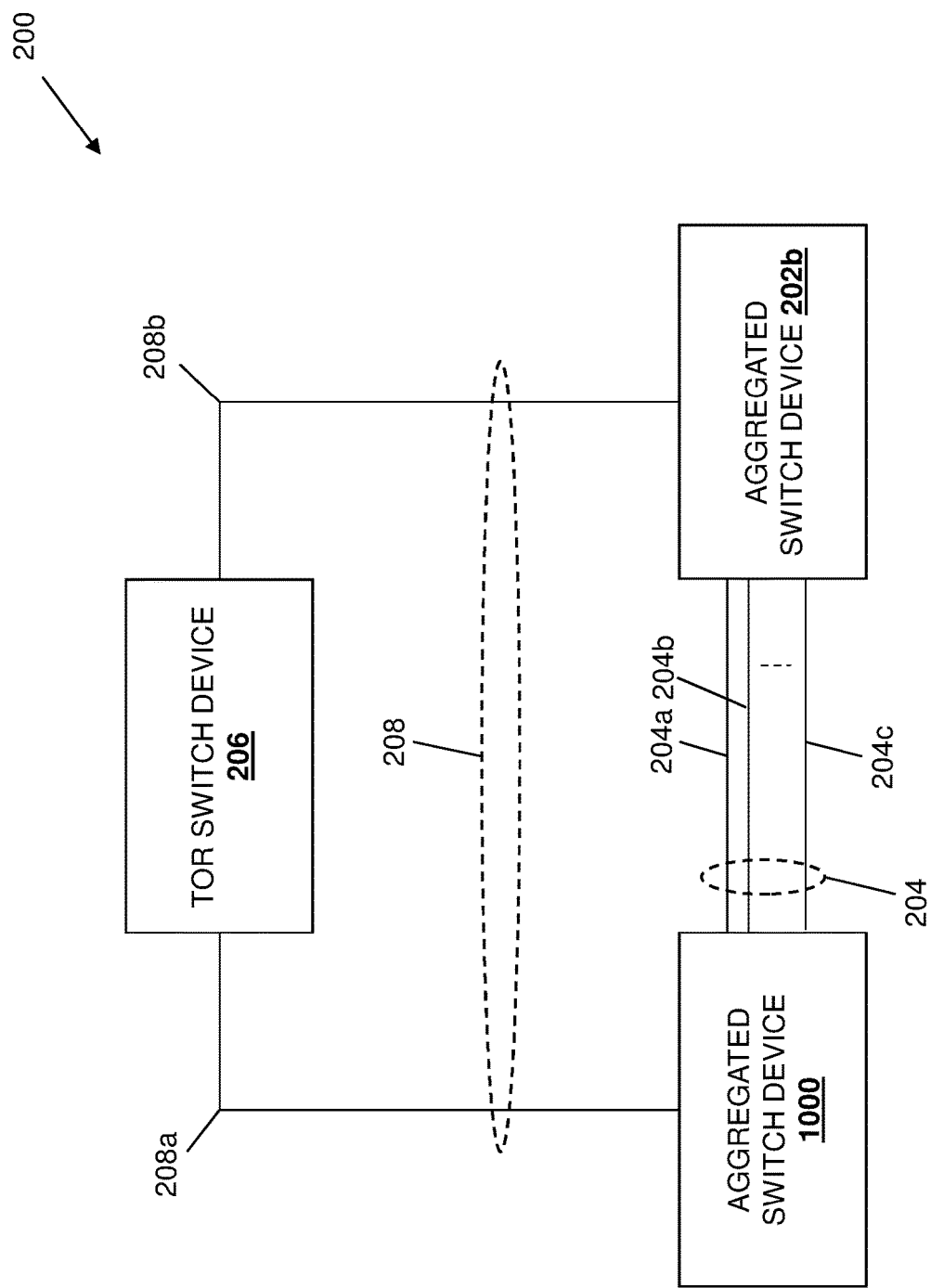
FIG. 10 is a schematic view illustrating an embodiment of the operation of the aggregated networking device system of FIG. 2 during the method of FIG. 5.

As illustrated in FIG. 10, in an embodiment, the aggregated switch device 202a that became unavailable may be replaced with an aggregated switch device 1000. In response, at decision block 502 the aggregated switch device 202b may provide an aggregation communication to the TOR switch device 206 that provides the MAC address of the aggregated switch device 202b as an actor MAC address, the MAC address of the aggregated switch device 1000 as an alternate actor MAC address, and the MAC address of the TOR switch device 206 as a partner MAC address. At decision block 504, the TOR switch device 206 may determine that the aggregated link 208 is not associated with the alternate actor identified by the aggregated switch device 202b, and may proceed to block 506 to associate the alternate actor MAC address (e.g., the MAC address of the aggregated switch device 1000) with the aggregated link 208. The TOR switch device 206 may then respond with an aggregation communication to the aggregated switch device 202b that provides the MAC address of the TOR switch device 206 as an actor MAC address, and the MAC address of the aggregated switch device 202b as a partner MAC address. As will be appreciated by one of skill in the art in possession of the present disclosure, in the event the aggregated switch device 202b becomes unavailable (e.g., similarly to the aggregated switch device 202a becoming unavailable as discussed above with reference to FIG. 9), the aggregated link 208 will be maintained with the aggregated switch device 1000 via the same techniques discussed above by which it was maintained with the aggregated switch device 202b.

Thus, systems and methods have been described that provide for the identification of an actor and alternate actor by VLT nodes associated with an VLT port channel, which allows that VLT port channel to remain available when a primary VLT node identified as the actor becomes unavailable and the secondary VLT node identified as the alternate actor performs failover operations and becomes a primary VLT node. For example, the VLT failover system of the present disclosure includes an aggregation connected device coupled to first and second VLT nodes. The aggregation connected device receives a first aggregation communication from the first VLT node that identifies its first MAC address of the first VLT node as an actor MAC address, and a second MAC address of the second VLT node as an alternate actor MAC address. The aggregation connected device then associates the first and second MAC addresses with a VLT port channel provided with the first and second VLT nodes. Subsequent to associating the first and second MAC addresses with the VLT port channel, the aggregation connected device receives a second aggregation communication from the second VLT node that identifies the second MAC address as an actor MAC address, and the VLT port channel remains available in response to that second MAC address/actor MAC address having been previously associated with the VLT port channel as an alternate actor MAC address. As such, VLT port channel "flapping" is eliminated in VLT node failover scenarios without the need to configure each aggregated VLT node with a common VLT MAC address.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An aggregated networking device failover system, comprising:
    a first aggregated networking device;

a second aggregated networking device that is aggregated with the first aggregated networking device; and an aggregation connected device that is coupled to the first aggregated networking device and the second aggregated networking device, wherein the aggregation connected device is configured to:

receive, from the first aggregated networking device, a first aggregation communication that identifies:

a first Media Access Control (MAC) address of the first aggregated networking device as an actor MAC address; and a second MAC address of the second aggregated networking device as an alternate actor MAC address, wherein the second MAC address is different than the first MAC address;

associate the first MAC address and the second MAC address with an aggregated link to the first aggregated networking device and the second aggregated networking device; and receive, from the second aggregated networking device subsequent to associating the first MAC address and the second MAC address with the aggregated link, a second aggregation communication that identifies the second MAC address as an actor MAC address, wherein the aggregated link remains available in response to the second MAC address that is identified as the actor MAC address being associated with the aggregated link.

2. The system of claim 1, wherein the aggregation connected device is configured to:

transmit, to the first aggregated networking device, a third aggregation communication that identifies:

a third MAC address of the aggregation connected device as an actor MAC address; and the first MAC address of the first aggregated networking device as a partner MAC address.

3. The system of claim 1, wherein the aggregation connected device is configured to:

receive, from the second aggregated networking device, a third aggregation communication that identifies:

the second MAC address of the second aggregated networking device as an actor MAC address; and the first MAC address of the first aggregated networking device as an alternate actor MAC address.

4. The system of claim 3, wherein the aggregation connected device is configured to:

transmit, to the second aggregated networking device, a fourth aggregation communication that identifies:

a third MAC address of the aggregation connected device as an actor MAC address; and the second MAC address of the second aggregated networking device as a partner MAC address.

5. The system of claim 1, wherein the first aggregation communication is a Link Aggregation Control Protocol (LACP) communication, and wherein the second MAC address of the second aggregated networking device is provided as the alternate actor MAC address in a Type-Length-Value (TLV) data structure in the LACP communication.

6. The system of claim 1, wherein the aggregation connected device receives the second aggregation communication that identifies the second MAC address as an actor MAC address in response to an unavailability of the first aggregated networking device.

7. An Information Handling System (IHS), comprising:
a processing system; and a memory system that is coupled to the processing system and that includes instructions that, when executed by the processing system, cause the processing system to provide an aggregation connected engine that is configured to:

receive, from a first aggregated networking device, a first aggregation communication that identifies:

a first Media Access Control (MAC) address of the first aggregated networking device as an actor MAC address; and a second MAC address of a second aggregated networking device as an alternate actor MAC address, wherein the second aggregated networking device is aggregated with the first aggregated networking device and the second MAC address is different than the first MAC address;

associate the first MAC address and the second MAC address with an aggregated link to the first aggregated networking device and the second aggregated networking device; and receive, from the second aggregated networking device subsequent to associating the first MAC address and the second MAC address with the aggregated link, a second aggregation communication that identifies the second MAC address as an actor MAC address, wherein the aggregated link remains available in response to the second MAC address that is identified as the actor MAC address being associated with the aggregated link.

8. The IHS of claim 7, wherein the aggregation connected engine is configured to:

transmit, to the first aggregated networking device, a third aggregation communication that identifies:

a third MAC address associated with the aggregation connected engine as an actor MAC address; and the first MAC address of the first aggregated networking device as a partner MAC address.

9. The IHS of claim 7, wherein the aggregation connected engine is configured to:

receive, from the second aggregated networking device, a third aggregation communication that identifies:

the second MAC address of the second aggregated networking device as an actor MAC address; and the first MAC address of the first aggregated networking device as an alternate actor MAC address.

10. The IHS of claim 9, wherein the aggregation connected engine is configured to:

transmit, to the second aggregated networking device, a fourth aggregation communication that identifies:

a third MAC address associated with the aggregation connected engine as an actor MAC address; and the second MAC address of the second aggregated networking device as a partner MAC address.

11. The IHS of claim 7, wherein the first aggregation communication is a Link Aggregation Control Protocol (LACP) communication, and wherein the second MAC address of the second aggregated networking device is provided as the alternate actor MAC address in a Type-Length-Value (TLV) data structure in the LACP communication.

12. The IHS of claim 7, wherein the aggregation connected engine receives the second aggregation communication that identifies the second MAC address as an actor MAC address in response to an unavailability of the first aggregated networking device.

13. The IHS of claim 7, wherein the aggregation connected engine is configured to:

receive, from the second aggregated networking device subsequent to associating the first MAC address and the second MAC address with the aggregated link, a third aggregation communication that identifies:
- the second MAC address of the second aggregated networking device as an actor MAC address; and
- a third MAC address of a third aggregated networking device as an alternate actor MAC address; and associate the second MAC address and the third MAC address with the aggregated link to the second aggregated networking device and the third aggregated networking device.

14. A method for performing failover with aggregated networking devices, comprising:

receiving, by an aggregation connected device from a first aggregated networking device, a first aggregation communication that identifies:
- a first Media Access Control (MAC) address of the first aggregated networking device as an actor MAC address; and
- a second MAC address of a second aggregated networking device as an alternate actor MAC address, wherein the second aggregated networking device is aggregated with the first aggregated networking device and the second MAC address is different than the first MAC address;

associating, by the aggregation connected device, the first MAC address and the second MAC address with an aggregated link to the first aggregated networking device and the second aggregated networking device; and receiving, by the aggregation connected device from the second aggregated networking device subsequent to associating the first MAC address and the second MAC address with the aggregated link, a second aggregation communication that identifies the second MAC address as an actor MAC address, wherein the aggregated link remains available in response to the second MAC address that is identified as the actor MAC address being associated with the aggregated link.

15. The method of claim 14, further comprising:

transmitting, by the aggregation connected device to the first aggregated networking device, a third aggregation communication that identifies:
- a third MAC address associated with the aggregation connected device as an actor MAC address; and
- the first MAC address of the first aggregated networking device as a partner MAC address.

16. The method of claim 14, further comprising:

receiving, by the aggregation connected device from the second aggregated networking device, a third aggregation communication that identifies:
- the second MAC address of the second aggregated networking device as an actor MAC address; and
- the first MAC address of the first aggregated networking device as an alternate actor MAC address.

17. The method of claim 16, further comprising:

transmitting, by the aggregation connected device to the second aggregated networking device, a fourth aggregation communication that identifies:
- a third MAC address associated with the aggregation connected device as an actor MAC address; and
- the second MAC address of the second aggregated networking device as a partner MAC address.

18. The method of claim 14, wherein the first aggregation communication is a Link Aggregation Control Protocol (LACP) communication, and wherein the second MAC address of the second aggregated networking device is provided as the alternate actor MAC address in a Type-Length-Value (TLV) data structure in the LACP communication.

19. The method of claim 14, wherein the aggregation connected device receives the second aggregation communication that identifies the second MAC address as an actor MAC address in response to an unavailability of the first aggregated networking device.

20. The method of claim 14, further comprising:

receiving, by the aggregation connected device from the second aggregated networking device subsequent to associating the first MAC address and the second MAC address with the aggregated link, a third aggregation communication that identifies:
- the second MAC address of the second aggregated networking device as an actor MAC address; and
- a third MAC address of a third aggregated networking device as an alternate actor MAC address; and associating, by the aggregation connected device, the second MAC address and the third MAC address with the aggregated link to the second aggregated networking device and the third aggregated networking device.

* * * * *